April 3, 1945.　　　　　　E. O. ENGELS　　　　　　2,373,076
OVEN MECHANISM
Filed Feb. 5, 1940　　　　2 Sheets-Sheet 1
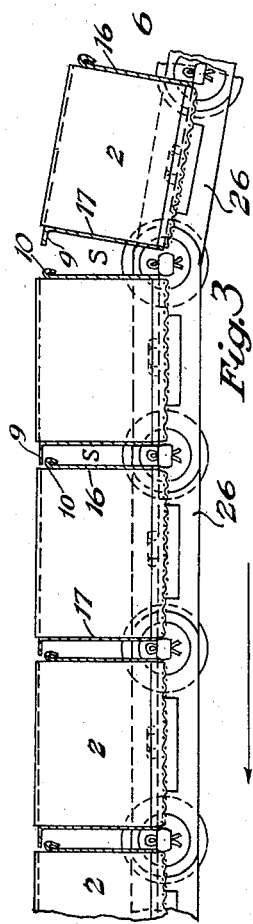
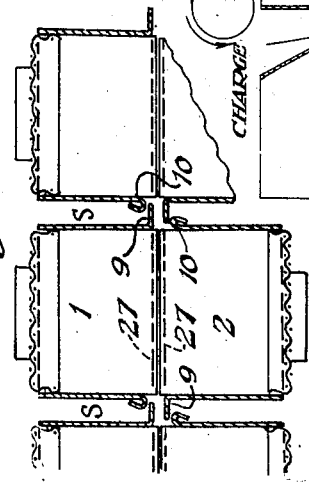
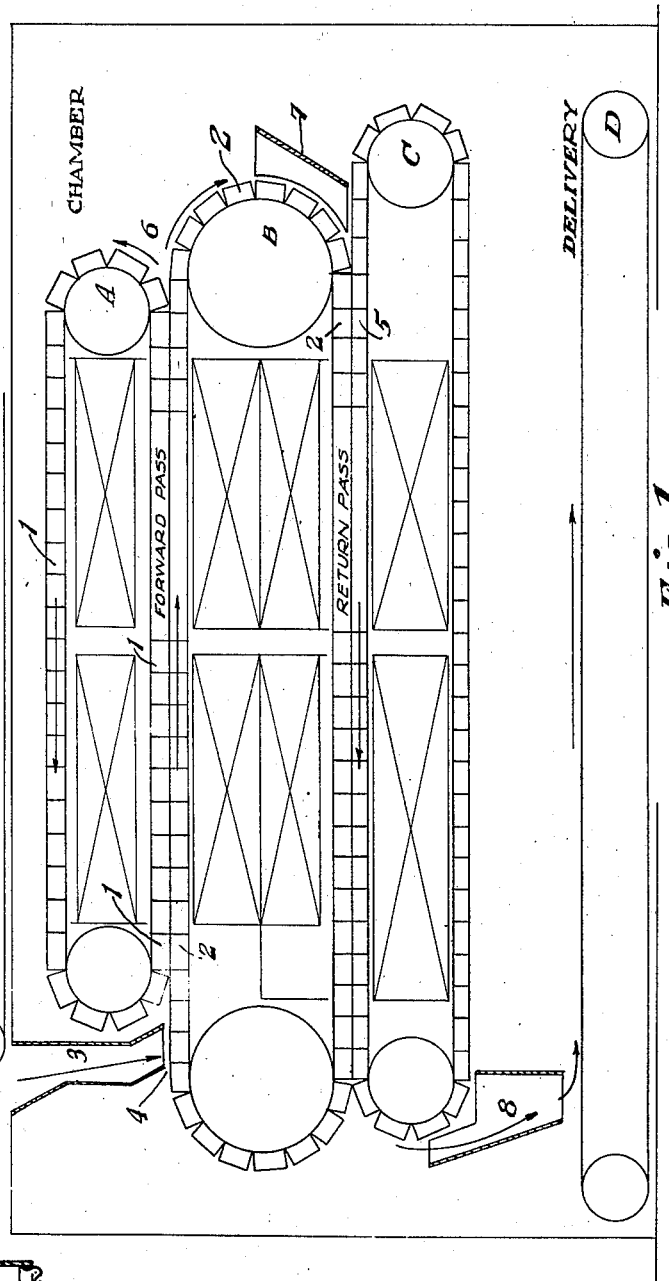
INVENTOR.
EUGENE OSCAR ENGELS
BY George B. Willcox
ATTORNEY April 3, 1945.   E. O. ENGELS   2,373,076
OVEN MECHANISM
Filed Feb. 5, 1940   2 Sheets-Sheet 2
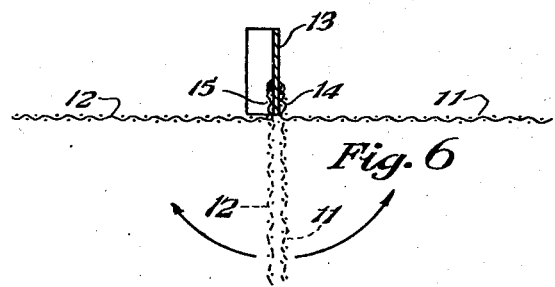
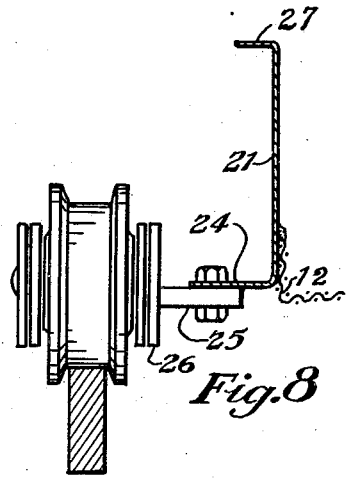
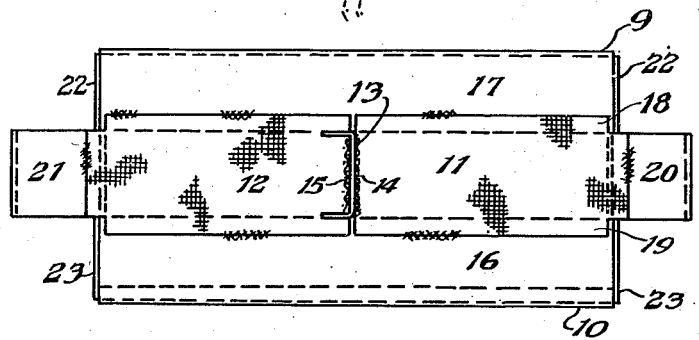
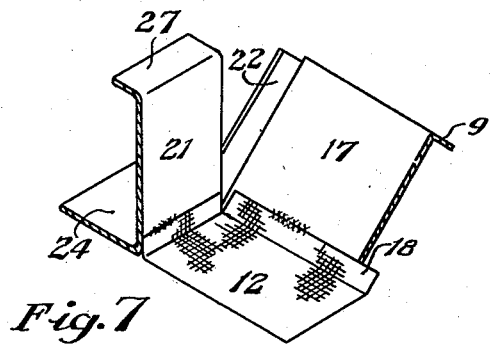
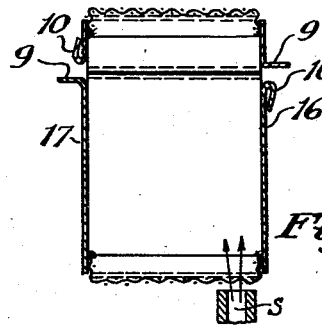
INVENTOR
EUGENE OSCAR ENGELS
BY
ATTORNEY Patented Apr. 3, 1945

2,373,076

UNITED STATES PATENT OFFICE 2,373,076

OVEN MECHANISM

Eugene Oscar Engels, Saginaw, Mich., assignor to Baker Perkins, Inc., Saginaw, Mich., a corporation of New York Application February 5, 1940, Serial No. 317,305

13 Claims. (Cl. 107—57)

This invention relates to bake ovens of the type wherein material is passed through a chamber kept at baking temperature by means of hot air and gaseous products that are impelled in a continuous closed circuit through the oven chamber, a furnace being provided for reheating the gases during each circulation. The present invention pertains to equipment for such ovens to enable them to treat goods that require special treatment, not required for baking bread or wafers; for example, the roasting of cereals, coffee berries, peas, beans, potato chips and the like. The structure as it is used in the toasting of corn flakes will be described.

It has been the custom to partly cook fractionate kernels of corn with suitable flavoring materials such as malt, sugar, and salt and then to roll the resultant soft granules into individual thin flakes. These flakes have usually been toasted and crisped by heat conduction directly from the hot surfaces of a tumbling barrel, exteriorly heated.

That earlier method of toasting had certain disadvantages: Breakage of flakes occurred if a large quantity was tumbled at a time. Bulky apparatus and considerable factory space was needed for a given daily output. Frequent adjustment of the heating apparatus was necessary during the toasting operation because variant degrees of heat sometimes developed at different places in the tumbling barrel, preventing uniform toasting of all the flakes of a batch. Inspectors were required to constantly examine the finished flakes on a carrier, discarding by hand the scorched or charred pieces. There was waste of marketable material because some good flakes were usually cast off with such discard.

An improved and novel toasting method is fully described and claimed per se in the copending application of Eugene O. Engels, Serial No. 257,376, filed February 20, 1939, and issued October 29, 1940, as Patent No. 2,219,329. Briefly stated, such method is as follows:

Within a closed container, having a perforate top and bottom, is confined a unit charge of material equal to approximately one third to one half of the capacity of the container. A stream of gas at toasting temperature is driven against a fractional part of the bottom area of the charge and discharged through the perforate top in expanded condition. Thus the affected portion of the unit charge is distributed throughout the container in a condition of temporary flotation. The unit charge and the impelled gas stream are moved relatively to each other until the entire charge in the container has been subjected to like treatment. The operation is repeated on the unit charge again and again until toasting is completed.

The problem with which the present claimed invention is more particularly concerned is to provide novel and useful equipment for practicing the method just described, by depositing the unit charges in containers, transporting them through the oven without spilling, scattering, or over-baking, and repeating the above mentioned operations so as to expose the flakes to uniform toasting action as many times as may be necessary to produce the desired crispness and color shade; finally discharging the finished flakes.

With the foregoing and certain other objects in view which will appear later in the specifications, this invention comprises the devices described and claimed and the equivalents thereof, whereby the above stated method is carried out in an economical and commercially satisfactory manner.

In the drawings,

Fig. 1 is a diagrammatic side view of an oven chamber equipped with conveying mechanism embodying a forward and a return pass and arrangement for charging, repouring and delivering the material at the end of a return pass.

Fig. 2 is a fragmentary transverse sectional view through upright and inverted baskets in register, together constituting a closed unit charge container.

Fig. 3 is a vertical sectional view showing the arrangement of several baskets on a conveyor, one of the baskets being diverted from the straight path defined by the remainder, the section being taken at the median vertical plane of the conveyor.

Fig. 4 is a similar vertical section showing a modified form of unit charge container.

Fig. 5 is a plan view showing the layout of parts for assembling a basket section.

Fig. 6 is a diagrammatic detail showing the manner in which the screened bottom is secured to the median partition of a basket section.

Fig. 7 is a detail in perspective, showing the assembly of the bottom, side, and end pieces of the basket section shown in Fig. 5.

Fig. 8 is a detailed view showing the connection between the conveyor link and the end wall of a basket section.

The material, divided into unit charges, is carried through a baking chamber on a conveyor system which I prefer to arrange in general as follows:

A power driven conveyor, A, has flights consisting of trough-like basket sections 1 arranged side by side and extending crosswise of the direction of conveyor travel with only small space between them. While traveling along the lower or working run of conveyor A during the first or forward pass these baskets 1 are upside down.

A similar conveyor, B, is installed below conveyor A, its upper run having a series of baskets 2 that travel upright and in register rim-to-rim with the respective inverted baskets 1 on the lower run of conveyor A. Two baskets when opposed as shown in Fig. 2 constitute a closed container that carries a unit charge of material through the chamber in a treatment pass, and beyond the end of conveyor A.

A charging spout 3 is located in front of the intake end of conveyor A, its function being to deliver material into the upright basket sections 2 of conveyor B before they come into register with and are covered by corresponding inverted sections, 1, on conveyor A. For that purpose a portion 4 of conveyor B extends underneath the spout 3, being a charging station.

The rate of feeding of material from the charging spout into the upright basket sections 2 is so established with respect to the rate of travel of conveyors A, B, that all baskets 2 shall receive substantially the same quantity. In the toasting of corn flakes, for example, the depth of material poured into each upright basket section 2 is usually one-third to one-half the height of the assembled two-part (1, 2) container unit, Fig. 2.

Two conveyors A, B may suffice for installations where toasting can be completed during one pass of the material forward through the chamber. However, I prefer to do the toasting in two passes, forward and return. For the return pass a similar third conveyor C, Fig. 1, is arranged below conveyor B; and basket sections 5, upright on its upper run, are kept in register with corresponding inverted baskets 2 on the lower run of conveyor B during the return pass.

At the terminus 6 of the first or forward pass, the sections 1, 2, comprising each assembled container, diverge, separating as indicated by the curved arrows, and the material pours from each upright section 2 of conveyor B, in regular order, being guided by an apron 7 located above an extended charging station portion of conveyor C and falling into the upright basket sections 5 on that conveyor. The unit charges from the forward pass are thus mixed by being turned over, in addition to the flotational turbulence already produced in them by streams of hot gas, referred to in the preceding description of the method and designated by arrows upwardly directed from an appropriate stream source S in Figure 4, the effect being to help prevent occasional flakes from becoming over-cooked.

Basket sections 2, 5 on conveyors B and C then come together edge-to-edge and travel toward the charging end of the chamber during the return pass, in which the toasting action continues.

At the end of the return pass the rim-to-rim matched basket sections of conveyors B and C separate, their directions of travel diverge, and the toasted material pours from the upright basket sections 5 into a delivery spout 8 and onto a cooling conveyor D that delivers it from the oven chamber.

I provide means to prevent stray pieces of material becoming pinched between moving parts of the conveyor system; because such happenings might cause breakage of the delicate crisped flakes; or because of fire hazards due to accumulation of combustible particles in the oven; or because "off color" pieces will mix with and harm the finished product whenever such pieces become pinched in moving parts of the conveyors, and as a result are carried more than the desired number of times through the toasting atmosphere.

I avoid such difficulties by certain new and useful improvements in the design and arrangement of the basket sections. These features will now be described, reference being had to Figs. 2 and 3.

Each basket section has a wall with its marginal edge portion provided with a flange 9 that projects outwardly and substantially spans the space between that section and the next adjacent one. Also, the wall of such adjacent basket has a beaded edge 10 that interlaps with the flange 9, being spaced therefrom sufficiently to avoid pinching and holding stray flakes or pieces of material. The overlapping flange 9 and bead 10 provide a roof over the normally existing spaces S between adjacent baskets and compel substantially all the material that pours from the charging spout to fall cleanly into the basket sections 2.

At the end 6 of the forward pass, where the basket sections 2 on conveyor B diverge and turn upside down and empty themselves into the basket sections 5 of the conveyor C, the flanges 9, Fig. 3 move away from the beaded edges 10, uncovering the spaces S and freeing all pieces that may have been caught temporarily between them.

The basket sections on all the conveyors A, B, C are preferably alike as to size, depth, and design, each being half of an assembled unit charge container, those on conveyor B serving first as a bottom half and then as a top half. However, if but one pass is used, the upper and lower opposed basket sections on conveyors A, B need not be the same depth; in fact, the upper section of each assembled container may be made shallower than the lower section as illustrated in Fig. 4; and in some installations I thus construct them, since for the purposes of a single pass the sections need not be made to serve both as a top half and then as a bottom half.

I have devised a novel structure to provide a basket section that is self-freeing so as to release all particles of material when inverted. This improved basket section is light and relatively inexpensive to manufacture yet is sufficiently strong and durable to serve as a conveyor flight.

One or more screen bottom members 11, 12, Fig. 5, are provided, being oblong pieces of wire mesh or perforate plate.

A median partition plate 13 has its bottom edge inserted between the end margins 14, 15 of the mesh, as is indicated by the broken lines in Fig. 6. The edges of the mesh are seam welded to the partition 13 and the meshes are then flanged up as indicated by the arrows into the position shown in full lines, the partition then standing perpendicular to the plane of the bottom members 11, 12. The partition 13 is an optional feature.

The upper longitudinal edges of the front and back walls 16, 17, Fig. 5, are provided, one with the bead 10, the other with the flange 9, as has been described. The longitudinal marginal edges 18, 19 of the bottom mesh pieces 11, 12 are upturned and the bottom marginal edges of the front and back walls 16, 17 overlap the edges 18, 19 and are seam welded thereto. Also, two end plates 20, 21 are similarly welded to the overlapping ends of the bottom members 11, 12. All four members, namely, ends 20, 21, front 16 and back 17, are then bent upright and the four vertical corners then formed are seam-welded, or the flanges 22, 23, on the front and back walls 16, 17 are lapped over the ends 20, 21 and spot welded thereto.

Each end plate 20, 21, has a flange 24 that projects from its bottom edge outwardly and is bolted to a lug 25, Fig. 8, on a chain link 26 of the oven conveyor. Also, each end plate 20, has a top flange 27 which is somewhat higher than the top edges of the bead on wall 16 and the flange on wall 17, so that when an upper basket section 1, Fig. 2, is in place on a lower section 2, the flange 9 and the bead 10 on one section will not touch the corresponding parts on the matching section. However, the end flanges 27, 27 will be in contact with each other, face to face. Thus all chance of pinching particles of material between flanges 9 and 10 will be avoided, and overtoasting of part of the goods is prevented.

With the arrangement described, the screened bottom members 12 and all the other basket members can be seam welded so smoothly that no crevice or corner is left in which thin flanges can become caught when the conveyor section is inverted, for emptying, at the entrance to the return pass and at discharge station 8.

Having thus described my invention, what I claim and desire to secure by Letters Patent is:

1. An oven for toasting flakes and the like having in the baking chamber thereof, in combination, a pair of conveyors presenting respectively a row of inverted container sections, a row of upright sections opposed thereto and in register edge-to-edge therewith, said inverted and upright rows being movable and traveling together and constituting a treatment pass for material, each container section having a marginal edge portion provided with a flange projecting outwardly and substantially spanning the normally existing space between such section and the next adjacent section, and arranged to uncover such space when the directions of travel of the adjacent sections diverge; a third similar conveyor arranged beneath the second conveyor and extending beyond the end of said pass to receive unit charges delivered therefrom, the second and third conveyors having inverted and upright rows of container sections in register, constituting a return pass through the baking chamber.

2. An oven for treating flakes and the like having in the baking chamber thereof an upper and lower conveyor presenting respectively a row of inverted container sections and a row of upright sections opposed to and registering therewith edge-to-edge and a third similar conveyor in register with the second, said three conveyors being movable together; an upper marginal edge portion of each container section being provided with a flange that projects outwardly and substantially spans the space between such section and an adjacent section, and opens such space when the directions of travel of said sections are caused to diverge; the second conveyor projecting forward of the first and presenting a charging station for a first pass, the third conveyor projecting beyond the end of the second and presenting a charging station for a return pass through the chamber.

3. A toasting basket for oven conveyors, comprising a perforate bottom member, front and back wall members the bottom marginal edges of which overlap upon upturned longitudinal edges on said bottom member and are welded thereto, the upper longitudinal edge of one of said walls having an outwardly projecting flange and the corresponding edge of the other wall presenting an outwardly projecting bead, end plates that similarly overlap upon upwardly flanged outer end margins of said bottom members, being welded thereto, said end plates having lugs projecting outwardly from their bottom edges; flanges projecting outwardly from the top edges of said end plates, the top faces of such flanges being higher than said longitudinal flange and bead.

4. A toasting basket for oven conveyors, comprising perforate bottom members having their inner end margins flanged upwardly, a partition plate received between and welded to the edges of said flanged margins, front and back wall members having bottom marginal edges overlapping upturned longitudinal marginal edges on said bottom members and being welded thereto, the upper longitudinal edge of one of said walls having an outwardly projecting flange and the corresponding edge of the other wall presenting an outwardly projecting bead, end plates similarly overlapping upon and welded to upwardly flanged outer end margins of said bottom members, said end plates having lugs projecting outwardly from their bottom edges; flanges projecting outwardly from the top edges of said end plates, the top faces of said flanges being higher than said first mentioned flange and said bead.

5. In combination, an oven, a plurality of chain conveyors arranged to travel in parallel in said oven and arranged in superimposed relationship, and boxes carried on said chains comprising solid end walls and side walls with foraminous bottoms and turned-over flanges, said boxes having one side wall formed with a flange higher than the turned-over flange of the next adjacent box and in spaced relationship thereto, and the end walls of said boxes formed with higher end flanges.

6. In combination, in an oven for toasting corn flakes, a plurality of superimposed conveyors of different lengths, said conveyors being progressively longer from top to bottom of the oven, and said conveyors being arranged in parallelism, open top boxes with foraminous bottoms mounted on each of said conveyors, chains for said conveyors, each adapted to support on each link an independent box, the boxes on the second conveyor being adapted to receive corn flakes prior to the interengagement of the boxes on the first and second conveyors, and means for discharging the contents of the second conveyor boxes into the third conveyor boxes prior to the interengagement of the second conveyor boxes with the third conveyor boxes.

7. In combination, a conveyor chain having links, a plurality of boxes each mounted on each link, said boxes having solid side walls and end walls and a foraminous bottom, rollers at the juncture of the links, and tracks for supporting said rollers.

8. In combination, an oven enclosure for cereal flakes, a plurality of conveyors therein arranged to travel in parallelism, said conveyors being of different length, box portions mounted on said conveyors, and when said box portions are combined together to form complete boxes as the conveyors operate, the combined box portions are provided with apertured top and bottom plates, the size of the apertures being less than the size of the flakes, a portion of said boxes being adapted to receive cereal flakes for toasting and means operable as the boxes receive cereal for causing an inverted empty box on one conveyor to engage the top of a filled box on another conveyor so that said boxes will travel with their respective conveyors in unison as a complete box with the foraminous top and bottom plates.

9. In combination, an oven enclosure, a plurality of conveyors therein arranged to travel in parallelism, said conveyors being of different length, boxes mounted on said conveyors having open tops and foraminous bottoms, a portion of said boxes being adapted to receive cereal for toasting, means operable as the boxes receive the cereal for causing an inverted empty box on one conveyor to engage the top of a filled box on another conveyor so that said boxes will travel with their respective conveyors in unison as a complete box with a foraminous top and bottom, and means including said conveyors for causing the boxes to engage at their ends only.

10. In combination, an oven enclosure, a plurality of conveyors therein arranged to travel in parallelism, said conveyors being of different length, boxes mounted on said conveyors having open tops and foraminous bottoms, a portion of said boxes being adapted to receive cereal for toasting, means operable as the boxes receive the cereal for causing an inverted empty box on one conveyor to engage the top of a filled box on another conveyor so that said boxes will travel with their respective conveyors in unison as a complete box with a foraminous top and bottom, means including said conveyors for causing the boxes to engage at their ends only, and means including an element on the sides of said boxes for causing said boxes to telescope on their side edges one within the other but without engagement.

11. In combination, a pair of parallel moving conveyors comprising chains and boxes mounted on each link of each chain, said boxes mounted thereon comprising side walls and end walls and foraminous bottoms, said boxes and conveyors being so arranged that flakes in the upper boxes of the upper conveyor are discharged into boxes of the lower conveyor and thereafter the boxes of the upper conveyor are brought in inverted relationship to the boxes of the lower conveyor and travel therewith in unison to form composite boxes.

12. In combination, a plurality of movable conveyors arranged to travel in parallelism, each conveyor comprising a plurality of box portions secured thereto and adapted to contain cereal flakes, said box portions having apertured bottom closing plates but completely open at the top, said apertures being of a size less than the size of the flakes, and means for directing heated air upwardly through the apertures in the bottom plates of one group of box portions and out through the apertures in the bottom plates of another group of box portions as the two groups of box portions are successively brought into registry by the movement of the conveyors in order simultaneously to agitate and heat the flakes.

13. In combination, an oven enclosure, a plurality of conveyors therein arranged to travel in parallelism, boxes mounted on said conveyors having open tops and foraminous bottoms, a portion of said boxes being adapted to receive cereal for toasting, means for causing an inverted empty box on one conveyor to engage the top of a filled box on another conveyor so that said boxes will travel with their respective conveyors in unison as a complete box with a foraminous top and bottom, and means including said conveyors for causing the boxes to engage at their tops only.

EUGENE OSCAR ENGELS.